United States Patent
Tamitsuji et al.

(10) Patent No.: US 7,934,391 B2
(45) Date of Patent: May 3, 2011

(54) SYNTHETIC QUARTZ GLASS BODY, PROCESS FOR PRODUCING THE SAME, OPTICAL ELEMENT, AND OPTICAL APPARATUS

(75) Inventors: Chikaya Tamitsuji, Tokyo (JP); Kunio Watanabe, Tokyo (JP); Kaname Okada, Tokyo (JP); Daisuke Kobayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/644,500

(22) Filed: Dec. 22, 2009

(65) Prior Publication Data

US 2010/0159227 A1 Jun. 24, 2010

Related U.S. Application Data

(63) Continuation of application No. PCT/JP2008/058455, filed on Apr. 25, 2008.

(30) Foreign Application Priority Data

Jun. 20, 2007 (JP) ................................ 2007-162921

(51) Int. Cl.
*C03C 15/00* (2006.01)
*B32B 3/26* (2006.01)

(52) U.S. Cl. ............... 65/30.13; 428/221; 428/312.8; 428/426; 65/30.1; 65/30.14; 65/32.2

(58) Field of Classification Search .................. None
See application file for complete search history.

(56) References Cited

U.S. PATENT DOCUMENTS

| 3,113,855 A | 12/1963 | Elmer |
| 3,485,687 A | 12/1969 | Chapman et al. |
| 4,693,738 A * | 9/1987 | Hoshikawa et al. ............ 65/397 |
| 4,880,452 A | 11/1989 | Kanamori et al. |
| 2003/0170459 A1 | 9/2003 | Lin |

FOREIGN PATENT DOCUMENTS

| EP | 0 139 348 | 5/1985 |
| EP | 0 177 040 | 4/1986 |
| JP | 59-232934 | 12/1984 |
| JP | 60-036343 | 2/1985 |
| JP | 2005-11894 | 1/2005 |
| WO | 2005-085952 | 9/2005 |
| WO | 2006-000643 | 1/2006 |

OTHER PUBLICATIONS

Smith C. M., et al., "Properties and production of F-doped silica glass", Journal of Fluorine Chemistry, vol. 122, (2003) pp. 81-86.

* cited by examiner

*Primary Examiner* — Ling Xu

(74) *Attorney, Agent, or Firm* — Oblon, Spivak, McClelland, Maier & Neustadt, L.L.P.

(57) ABSTRACT

The present invention is to provide a synthetic quartz glass body having a high light transmittance. The present invention provides a synthetic quartz glass body having pores in a surface part thereof.

8 Claims, 6 Drawing Sheets

(a)

(b)

SYNTHETIC QUARTZ GLASS BODY, PROCESS FOR PRODUCING THE SAME, OPTICAL ELEMENT, AND OPTICAL APPARATUS

TECHNICAL FIELD

The present invention relates to a synthetic quartz glass body having a high light transmittance.

BACKGROUND ART

With the recent trend toward higher degrees of integration and higher densities in semiconductor integrated circuits, an exposure tool for semiconductor device production employing an ArF excimer laser (193 nm) as an exposure light source has come to be used for producing a fine and precise circuit pattern by photolithography. In the optical system of this apparatus, a synthetic quartz glass body having excellent light-transmitting properties is frequently used as an optical element.

However, there are cases where even when a synthetic quartz glass body is used, the quantity of light passing through this glass body is small due to reflection by a surface thereof and this is regarded as problematic.

One example thereof is the exposure tool for semiconductor device production. In the exposure tool for semiconductor device production, synthetic quartz glass bodies are used as optical elements arranged between the laser light source and a wafer. However, in the optical elements through which the light passes, such as lenses, there are often cases where the amount of the light passing therethrough is small due to surface reflection and the amount of the light which finally reaches the wafer is considerably small. There is hence a desire for a highly transparent synthetic quartz glass body showing a minimized light quantity loss.

On the other hand, an excimer lamp is used in dry cleaning for removing organic contaminants from a display substrate or the like in liquid-crystal display production steps. In this case, ultraviolet light which has passed through a window made of a synthetic quartz glass yields atomic oxygen, which chemically reacts with organic contaminants present on the substrate to oxidize/gasify the organic contaminants and thereby clean the substrate. The larger the quantity of light with which the substrate is irradiated in this cleaning operation, the more rapidly the dry cleaning can be conducted. There is hence a desire for a window material made of a highly transparent synthetic quartz glass.

A highly transparent synthetic quartz glass body has hitherto been realized by forming an antireflection film made of a fluoride, e.g., $MgF_2$, on the surface of a synthetic quartz glass body by a method such as vapor deposition or sputtering. However, this technique has had a problem that fluorine-deficient sites (sites where fluorine has been eliminated from the fluoride) formed in the antireflection film absorb light to reduce the light transmittance. There also has been a problem that the antireflection film has insufficient film strength and readily peels off upon an operation such as, e.g., wiping.

Patent Document 1: JP-A-60-36343 (Claims)
Patent Document 2: JP-A-59-232934 (Claims)
Non-Patent Document 1: *Journal of Fluorine Chemistry*, 2003, Vol. 122, pp. 81-86

DISCLOSURE OF THE INVENTION

An object of the invention is to provide a novel synthetic quartz glass body reduced in light reflection. Other objects and advantages of the invention will become apparent from the following description.

The present invention relates to the following subject matter.

1. A synthetic quartz glass body which has pores in a surface part thereof.
2. The synthetic quartz glass body of item 1 above, wherein the pores in the surface part have been formed by physical or chemical etching.
3. The synthetic quartz glass body of item 2 above, wherein the pores in the surface part have been formed by etching with a fluorinating agent.
4. A synthetic quartz glass body which has a surface part having a gradient fluorine atom concentration decreasing from the surface toward the depth direction.
5. A synthetic quartz glass body which has pores in a surface part thereof, the surface part having a gradient fluorine atom concentration decreasing from the surface toward the depth direction.
6. The synthetic quartz glass body of any one of items 1 to 5 above, which satisfies at least one of the following requirements (1) to (6):
   (1) the synthetic quartz glass body has a light transmittance of 91.0% or higher when examined with ArF laser light (wavelength: 193 nm) incoming on the surface part at an incidence angle of 0°;
   (2) the synthetic quartz glass body has a light transmittance of 92.4% or higher when examined with KrF laser light (wavelength: 248 nm) incoming on the surface part at an incidence angle of 0°;
   (3) the synthetic quartz glass body has a light transmittance of 92.5% or higher when examined with the fourth harmonic of YAG light (wavelength: 266 nm) incoming on the surface part at an incidence angle of 0°;
   (4) the synthetic quartz glass body has a light transmittance of 93.0% or higher when examined with the third harmonic of YAG light (wavelength: 355 nm) incoming on the surface part at an incidence angle of 0°;
   (5) the synthetic quartz glass body has a light transmittance of 89.5% or higher when examined with xenon excimer lamp light (wavelength: 172 nm) incoming on the surface part at an incidence angle of 0°; and
   (6) the synthetic quartz glass body has a light transmittance of 93.0% or higher when examined with XeCl laser light (wavelength: 308 nm) incoming on the surface part at an incidence angle of 0°.
7. The synthetic quartz glass body of any one of items 4 to 6 above, having a fluorine concentration in an outermost surface of from 1,000 ppm by weight to 2% by weight.
8. The synthetic quartz glass body of any one of items 4 to 7 above, wherein when depth from the surface and the logarithm of fluorine concentration at a given depth from the surface are plotted along the X axis and the Y axis, respectively, to obtain a linear relational expression concerning Y value and X value by the least square method, then the depth from the surface at a fluorine concentration of 100 ppm by weight as obtained using the linear relational expression is 500 nm or smaller.
9. A process for producing a synthetic quartz glass body having a modified surface part which comprises:
   bringing a fluorinating agent into contact with a surface of a synthetic quartz glass body; and
   infiltrating the fluorinating agent to inside the synthetic quartz glass body to modify the surface part.
10. The process for producing a synthetic quartz glass body of item 9 above, wherein the contact is made in the presence of a solid metal fluoride.
11. The process for producing a synthetic quartz glass body of item 10 above, wherein the solid metal fluoride comprises one member selected from the group consisting of fluorides of alkali metals, fluorides of alkaline earth metals, and mixtures thereof.

12. The process for producing a synthetic quartz glass body of any one of items 9 to 11 above, wherein the contact comprises bringing either a gas of the fluorinating agent or a gas mixture obtained by diluting the fluorinating agent with an inert gas into contact with the synthetic quartz glass body.

13. The process of item 12 above, wherein the fluorinating agent comprises one member selected from the group consisting of elemental fluorine, silicon tetrafluoride, and mixtures thereof.

14. The process of item 12 above, wherein the gas of the fluorinating agent or the gas mixture has a temperature in the range of from −50 to 300° C.

15. The process of any one of items 9 to 14 above, wherein the fluorinating agent has a partial pressure in the range of from 1 kPa to 500 kPa.

16. The process of any one of items 9 to 15 above, wherein the contacting treatment with the fluorinating agent is conducted until the synthetic quartz glass body being treated comes to satisfy at least one of the following requirements (1) to (6):

(1) the synthetic quartz glass body has a light transmittance of 91.0% or higher when examined with ArF laser light (wavelength: 193 nm) incoming on the surface part at an incidence angle of 0°;

(2) the synthetic quartz glass body has a light transmittance of 92.4% or higher when examined with KrF laser light (wavelength: 248 nm) incoming on the surface part at an incidence angle of 0°;

(3) the synthetic quartz glass body has a light transmittance of 92.5% or higher when examined with the fourth harmonic of YAG light (wavelength: 266 nm) incoming on the surface part at an incidence angle of 0°;

(4) the synthetic quartz glass body has a light transmittance of 93.0% or higher when examined with the third harmonic of YAG light (wavelength: 355 nm) incoming on the surface part at an incidence angle of 0°;

(5) the synthetic quartz glass body has a light transmittance of 89.5% or higher when examined with xenon excimer lamp light (wavelength: 172 nm) incoming on the surface part at an incidence angle of 0°; and (6) the synthetic quartz glass body has a light transmittance of 93.0% or higher when examined with XeCl laser light (wavelength: 308 nm) incoming on the surface part at an incidence angle of 0°.

17. A synthetic quartz glass body produced by the process of any one of items 9 to 16 above.

18. The synthetic quartz glass body of any one of items 1 to 8 and 17 above, wherein the synthetic quartz glass body is a product which may have even or uneven thickness and may have a lens shape, and which has the surface part at least one side thereof.

19. The synthetic quartz glass body of item 18 above, wherein the product has even thickness.

20. The synthetic quartz glass body of item 18 or 19 above, wherein the product has a flat surface.

21. The synthetic quartz glass body of any one of items 18 to 20 above, having the surface part on each of both sides thereof.

22. An optical element comprising the synthetic quartz glass body of any one of items 1 to 7 and 17 above.

23. The optical element of item 22 above, wherein the synthetic quartz glass body is to be used for transmitting a light selected from the group consisting of infrared light, visible light, and ultraviolet light.

24. The optical element of item 23 above, wherein the light passes through the synthetic quartz glass body twice or more times.

25. The optical element of any one of items 22 to 24 above, which is to be used for exposure treatment in a semiconductor device production.

26. The optical element of any one of items 22 to 25 above, which is one member selected from the group consisting of a lens, a prism, an optical fiber, an optical window, an optical filter, a diffraction grating, a wire grid polarizing filter, and a wavelength plate.

27. An optical apparatus having the optical element of any one of items 22 to 26 above.

28. An exposure tool for semiconductor device production, having the optical element of any one of items 22 to 26.

According to the invention, a synthetic quartz glass body reduced in reflection is obtained.

BRIEF DESCRIPTION OF THE DRAWINGS

FIG. 4-B is graphs each showing the relationship between fluorine atom concentration before silane coupling agent treatment $C_{F0}$ and depth from the surface of the synthetic quartz glass plate.

Figure 1:
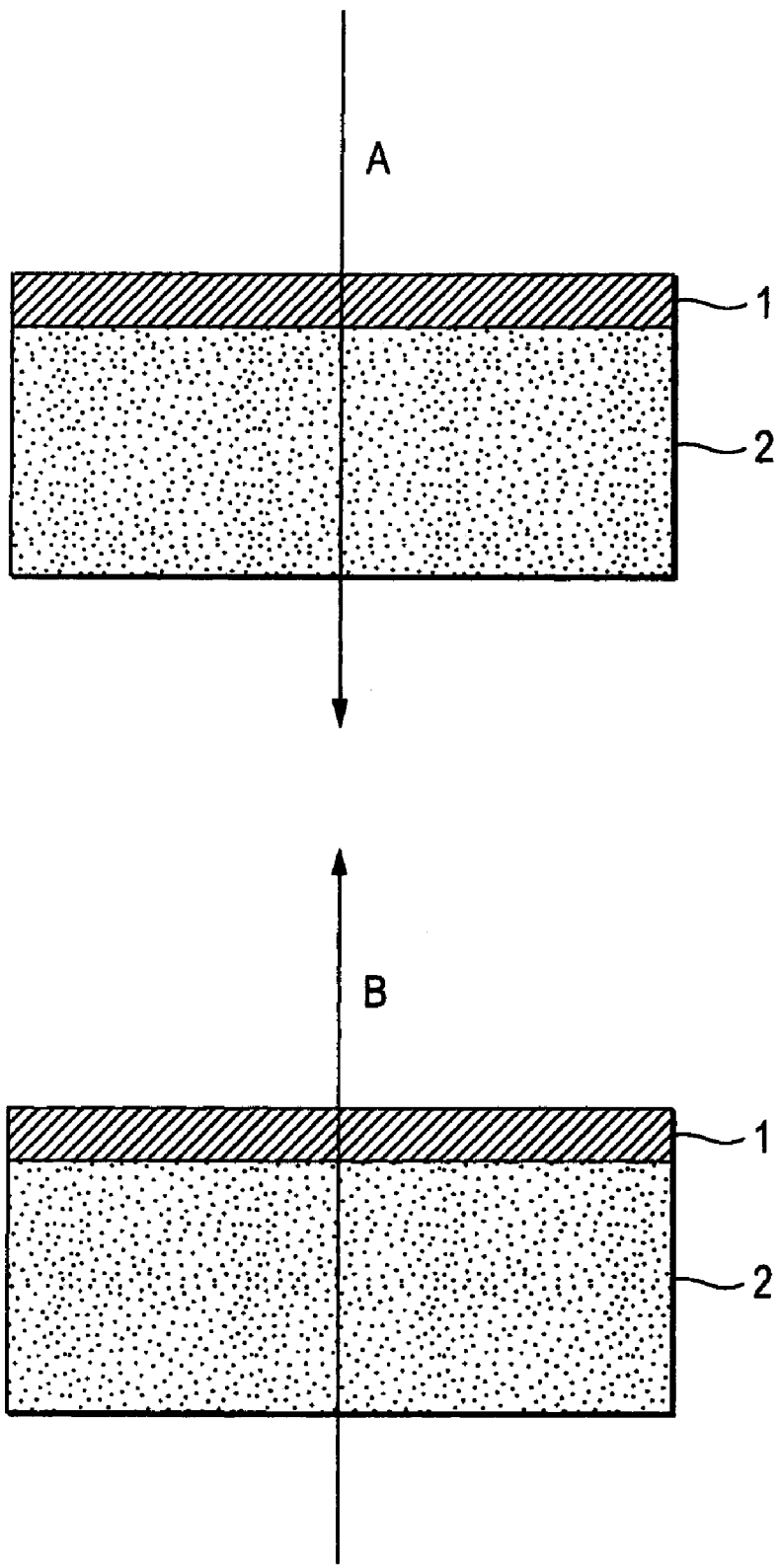
FIG. 1 is diagrammatic sectional views illustrating an example of a plate-shaped synthetic quartz body according to the invention.

The reference numerals used in the drawings denote the followings, respectively.

1: Fluorine-containing layer
2: Inner part

BEST MODE FOR CARRYING OUT THE INVENTION

Embodiments of the invention will be described below by reference to the drawings, table, Examples, etc. These drawings, table, Examples, etc. and the description are illustrative of the invention and should not be construed as limiting the scope of the invention. It is a matter of course that other embodiments can be within the scope of the invention so long as they are in agreement with the spirit of the invention. Incidentally, the same reference numeral or sign indicates the same element.

<Definitions, etc.>

In the invention, "synthetic quartz glass body" means an object made of a synthetic quartz glass and having a certain shape. The "shape" and the kind of the "object" are not particularly limited.

The synthetic quartz glass body according to the invention can be obtained from a known quartz glass as a starting material. The pure quartz glass as a starting material has a refractive index generally in the range of 1.55-1.57 when examined with the light having a wavelength of 193 nm. As will be described later, there are cases where the synthetic quartz glass body may contain fluorine. The synthetic quartz glass body may also be one doped with other substances. In this connection, when the term "synthetic quartz glass body" is used in this specification, it can imply not only a pure synthetic quartz glass but also one doped with fluorine or another substance, according to the context.

The term "surface part" in the invention means a surface of the synthetic quartz glass body and a part extending from the surface to a certain depth therefrom. It should, however, be noted that the "depth" need not have a specific value. For example, the "pores" which will be described later have a certain size. However, the size thereof has not been grasped so far, and it is difficult to clearly grasp the depth to which the pores extend. On the other hand, the depth-direction distribution of fluorine concentration can be determined by SIMS (secondary-ion mass spectrometry). However, measurement accuracy is limited and it is impossible to precisely determine the thickness of a fluorine-containing layer. Incidentally, there are cases where two or more "surface parts" are present. For example, in a synthetic quartz glass body which is plate-shaped, the "surface parts" in the ordinary sense are surface parts respectively relating to the two wide surfaces. However, since a plate-shaped synthetic quartz glass body is a kind of rectangular solid, it can be considered that there are four narrow surfaces besides those two surfaces.

<Findings Relating to the Invention>

As a result of investigations on the etching of a synthetic quartz glass body with a fluorinating agent, it was found with an AFM (atomic force microscope) that the synthetic quartz glass body comes to have a reduced reflectance and have pores in a surface part thereof.

The pores are thought to be open pores and filled with air when the glass body is placed in the air. Consequently, due to the presence of the pores, the synthetic quartz glass areas in combination with the pore areas in the surface part of the synthetic quartz glass body produce the effect of having a lower refractive index than inner parts of the synthetic quartz glass body. This is, thought to enable the synthetic quartz glass body to have a reduced reflectance. On the other hand, a surface part of the synthetic quartz glass body has been doped with fluorine, and this fluorine doping also should cause the surface part to have a lower refractive index than inner parts of the synthetic quartz glass body. It is therefore thought that the reduction in reflectance is attributable to a combination of those two effects.

No method is known by which those two effects can be separately grasped. Instead, the refractive index of a synthetic quartz glass body doped with fluorine to the same degree by a method not resulting in the formation of such pores was compared with the results given above. As a result, it was found that the two effects are obtained and the effect of pores is considerably higher.

The reasons why the effect of reducing reflectance is produced when a surface part of the synthetic quartz glass body has a lower refractive index than inner parts thereof are thought to be as follows. When a light passing through one medium (refractive index, $n_1$) enters another medium (refractive index, $n_2$), the reflectance concerning light reflection occurring at the interface between the two media depends on the difference in refractive index between these two media. The larger the difference in refractive index, the higher the reflectance. This relationship can be expressed, specifically, by the following expression.

$$\text{Reflectance } R=(n_1-n_2)^2/(n_1+n_2)^2$$

Assuming that a light enters a synthetic quartz glass body from a medium such as air or vacuum and this glass body has a surface part according to the invention, this surface part has a lower refractive index than inner parts. Consequently, the light which enters the synthetic quartz glass body from air or vacuum undergoes reduced reflection at the surface of the glass body.

It should, however, be noted that a homogeneous synthetic quartz glass body having no surface part is free from reflection attributable to an internal difference in refractive index, whereas the glass body of the invention can have such reflection. In this case, however, the light reflected when a light enters the surface part according to the invention from a medium such as air or vacuum can counteract the light reflected when the incident light goes inward from the surface part according to the invention, resulting in a decrease in reflectance. Assuming a model where the surface part according to the invention has a given thickness and a given refractive index, an optimal film thickness most effective in reducing reflection at a certain wavelength in this model can be determined using the following calculation formula:

$$nd=q\times\lambda/4$$

wherein n is the refractive index of the surface part; d is the film thickness; $\lambda$ is the wavelength of the incident light; and q=1, 3, 5, 7, . . . .

In the case of the invention, the surface part has been doped with fluorine. Because of this, it is thought that the amount of pores and the content of fluorine each have an inward gradient from the surface and show a gradient decrease toward the depth direction. Therefore, mere application of the formula given above is improper. However, as a result of investigations on the etching of a synthetic quartz glass body with a fluorinating agent, it is thought that the reflectance of a synthetic quartz glass body is reduced probably by that mechanism. It should, however, be noted that the invention is not influenced at all by whether that mechanism is right or wrong.

Figure 2:
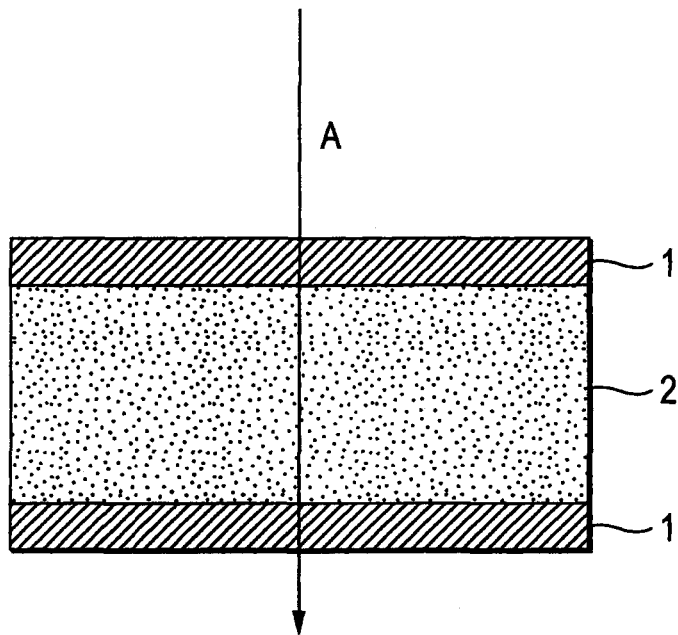
FIG. 2 is a diagrammatic sectional view illustrating another example of the plate-shaped synthetic quartz body according to the invention.

The effect described above is obtained not only in the case where light passes through the surface part according to the invention and then through inner parts but also in the reverse case in which light passes through inner parts and then through the surface part according to the invention. Namely, on the assumption that this glass body is, for example, a plate-shaped synthetic quartz body such as that shown in FIG. 1, the effect of reducing reflectance is obtained not only in the case of light A which passes through a surface part 1 according to the invention and then through an inner part 2 but also in the reverse case, i.e., the case of light B which passes through the inner part 2 and then through the surface part 1 according to the invention. Furthermore, the effect of reducing reflectance is obtained also in the case of light C which passes through a three-layer structure composed of a surface part 1 according to the invention, an inner part 2, and a surface part 1 according to the invention as shown in FIG. 2. When the three-layer structure is equal to a two-layer structure composed of a surface part 1 according to the invention and an inner part 2 in the constitution of the surface part according to the invention and the constitution of the inner part 2, then the three-layer structure is more effective in reducing reflectance than the two-layer structure. Because of this, the synthetic quartz glass body according to the invention is effective also in the case where a light which has once passed through the synthetic quartz glass body is reflected by something and then passes through the synthetic quartz glass body again. In FIGS. 1 and 2, the surface parts according to the invention each are shown as a distinct layer. However, this is intended for an easier understanding of the explanation, and does not mean that there is a clear boundary between each surface part according to the invention and the inner part.

First Embodiment of the Invention

It was found from the results of investigations given above that a synthetic quartz glass body having pores in a surface part thereof can have a lower reflectance than a synthetic quartz glass body which does not have such a surface part. Namely, according to one embodiment of the invention, a synthetic quartz glass body is provided which has pores in a surface part thereof. Due to this structure, a synthetic quartz glass body reduced in light reflection is obtained.

The role of the pores is to reduce refractive index in the space occupied by the pores. The pores therefore may be pores of the open type as in the examples shown above or may be pores having a closed space.

The shape and size of the pores in the examples given above have not been fully grasped so far. It is hence unclear as to what shape and size of pores are preferred. However, this constitutes especially no obstacle when there is a technique actually usable for forming pores, because the effect of reducing light reflection may be grasped after the technique is practiced.

Because the effect of pores according to the invention is thought to be attributable to the low refractive index of the space occupied by the pores, it is thought that these pores may be formed by any method. For example, physical or chemical etching is a suitable method because it erodes the surface of the synthetic quartz glass body. There are no particular limitations on the kind of physical etching or chemical etching.

Preferred examples of the chemical etching include etching with a fluorinating agent. The term fluorinating agent in the invention means either a substance which contains fluorine as part of the chemical structure thereof and is capable of reacting with the silicon atom of a quartz glass body or a substance which undergoes decomposition, e.g., by heat, to thereby yield a substance containing fluorine as part of the chemical structure thereof and capable of reacting with the silicon atom of a quartz glass body. The fluorinating agent in the invention may be elemental fluorine itself or may be any substance containing fluorine as part of a chemical bond. Whether a substance is a fluorinating agent useful for the chemical etching or not can be easily ascertained by actually using the substance.

Typical examples of the fluorinating agent in the invention include elemental fluorine, hydrogen fluoride, silicon tetrafluoride, and mixtures of these. However, care should be taken in using hydrogen fluoride because it is apt to cause surface roughening and, hence, may function to reduce rather than increase light transmittance. This may be because hydrogen fluoride rapidly erodes the surface to form no pores, or because hydrogen fluoride forms pores but enhanced light scattering at the surface due to the resultant surface roughness exerts a considerable influence. Consequently, more preferred fluorinating agents are elemental fluorine, silicon tetrafluoride, and mixtures of these. Most preferred of these is elemental fluorine.

Second and Third Embodiments of the Invention

When the investigation results given above are viewed from another angle, another embodiment of the invention can be a synthetic quartz glass body which has a surface part having a gradient fluorine atom concentration decreasing from the surface toward the depth direction. Due to this structure, a synthetic quartz glass body can be reduced in light reflection by doping with fluorine.

Furthermore, by combining the two embodiments described above, a third embodiment can be provided which is a synthetic quartz glass body having pores in a surface part thereof, the surface part having a gradient fluorine atom concentration decreasing from the surface toward the depth direction. Due to this structure, a combined effect can be realized which is the effects of reducing the light reflection of a synthetic quartz glass body by doping with fluorine and of reducing the light reflection of the synthetic quartz glass body by the presence of pores.

It is thought that an essential feature of the invention resides in that a surface part is caused to have a lower refractive index than inner parts as described above. Consequently, this invention is thought to be capable of being extended also to the case where the synthetic quartz glass part underlying the surface part already contains fluorine. Namely, the invention is applicable even when the original synthetic quartz glass body itself already contains fluorine.

By imparting a gradient fluorine atom concentration decreasing from the surface toward the depth direction, the concentration of that fluorine present in a near-surface part which should contribute to prevention of light reflection is efficiently heightened and this glass body can be reduced in light reflection. As a result of investigations, it was found that the fluorine concentration in an outermost surface is preferably in the range of from 1,000 ppm by weight to 2% by weight. When the concentration thereof is lower than 1,000 ppm by weight, there frequently are cases where the effect of reducing light reflection is insufficient. In case where the concentration thereof exceeds 2% by weight, the time period required for heightening fluorine concentration is prolonged. In this case, when etching with fluorine is employed, it is difficult to control the etching and this can pose a problem that the resultant surface roughness enhances light scattering. The term "fluorine concentration in an outermost surface" in the invention means a fluorine concentration obtained as a result of an examination of the surface. For this examination, SIMS can, for example, be used advantageously.

With respect to the gradient decrease, it was found that when depth from the surface and the logarithm of fluorine concentration at a given depth from the surface are plotted along the X axis and the Y axis, respectively, the plot includes an area where the relationship between X and Y is statistically linear. This linear relationship can be expressed as a linear relational expression concerning Y value and X value obtained by the least square method.

In the embodiments described above, it was found that when the synthetic quartz glass body has been doped with fluorine, that depth ($X_{100}$) from the surface which corresponds to a fluorine concentration of 100 ppm by weight in the linear relational expression thus determined is preferably 500 nm or smaller. Even when the depth ($X_{100}$) from the surface which corresponds to a fluorine concentration of 100 ppm by weight is increased beyond 500 nm, the effect of reducing reflectance is not greatly improved. In some cases, such a large value of $X_{100}$ may result in a reduced light transmittance. This decrease in light transmittance is probably attributable to the enhanced surface roughness of the synthetic quartz glass body caused by the fluorine doping.

When each of the embodiments of the invention is viewed from the standpoint of light transmittance, it is useful for the embodiment to be characterized by having a given light transmittance or higher when a given light is used as incident light. This characterization enables the synthetic quartz glass body according to the invention to be suitable for use in the various applications which will be given later.

This characterization can be summarized as shown below.

(1) The synthetic quartz glass body has a light transmittance of 91.0% or higher when examined with ArF laser light (wavelength, 193 nm) incoming on the surface part at an incidence angle of 0°.

(2) The synthetic quartz glass body has a light transmittance of 92.4% or higher when examined with KrF laser light (wavelength, 248 nm) incoming on the surface part at an incidence angle of 0°.

(3) The synthetic quartz glass body has a light transmittance of 92.5% or higher when examined with the fourth harmonic of YAG light (wavelength, 266 nm) incoming on the surface part at an incidence angle of 0°.

(4) The synthetic quartz glass body has a light transmittance of 93.0% or higher when examined with the third harmonic of YAG light (wavelength, 355 nm) incoming on the surface part at an incidence angle of 0°.

(5) The synthetic quartz glass body has a light transmittance of 89.5% or higher when examined with xenon excimer lamp light (wavelength, 172 nm) incoming on the surface part at an incidence angle of 0°.

(6) The synthetic quartz glass body has a light transmittance of 93.0% or higher when examined with XeCl laser light (wavelength, 308 nm) incoming on the surface part at an incidence angle of 0°.

In the case (1), the synthetic quartz glass body is especially suitable for use in medical lasers, microfabrication apparatus, and exposure tool for semiconductor device production. In the case (2), the synthetic quartz glass body is especially suitable for use in microfabrication apparatus and exposure tool for semiconductor device production. In the cases (3) and (4), the synthetic quartz glass body is especially suitable for use in microfabrication apparatus and laser markers. In the case (5), the synthetic quartz glass body is especially suitable for use in a dry-cleaning device in semiconductor device production facilities. In the case (6), the synthetic quartz glass body is especially suitable for use in a laser annealing apparatus for low-temperature poly-Si TFT LCDs.

Fourth Embodiment of the Invention

A further embodiment of the invention is a process for producing a synthetic quartz glass body having a modified surface part. This process comprises bringing a fluorinating agent into contact with a surface of a synthetic quartz glass body and infiltrating the fluorinating agent to inside the synthetic quartz glass body to modify the surface part.

By the process of the invention, a synthetic quartz glass body having a surface part having a gradient fluorine atom concentration decreasing from the surface toward the depth direction is obtained. It is possible to form the surface part so as to have pores therein.

Doping a synthetic quartz glass with fluorine is known (see non-patent document 1). Various proposals have hitherto been made on techniques for introducing fluorine atoms while forming chemical bonds with the synthetic quartz glass. Examples thereof include the following.

(1) A process which comprises subjecting a glass-forming raw material to flame hydrolysis to form a porous quartz glass body and then heating the resultant porous quartz glass body at 1,400° C. or higher in an atmosphere comprising a fluorine compound gas and an inert gas to convert the glass body to a transparent glass (see patent document 1).

(2) A process in which fine glass particles are grown by the VAD (vapor-phase axial deposition) method while feeding a fluorine compound gas ($SiF_4$) by incorporating the gas into the gas of a raw glass material or into a combustion gas in a concentration which does not change with time. This process comprises subjecting these gases to a flame hydrolysis reaction to deposit fine glass particles in the target axis direction and then converting the fine glass particles to a transparent glass and thereby obtain a glass base for optical fibers (see patent document 2).

However, these techniques each are one in which fluorine is introduced by a high-temperature treatment before or during conversion into a transparent glass. Because of this, the resultant formed synthetic quartz glass contains fluorine incorporated up to inner parts thereof. No method is known in which a fluorinating agent is brought into contact with a surface of a synthetic quartz glass body and infiltrating the fluorinating agent to inside the synthetic quartz glass body to modify the surface part, as in the case of the synthetic quartz glass body according to the invention.

Methods for bringing a fluorinating agent into contact with a surface of a synthetic quartz glass body are not particularly limited, and a suitable one may be selected from known methods. Examples thereof include a method in which a gaseous fluorinating agent or a gas mixture obtained by suitably diluting a gaseous fluorinating agent with another gas is brought into contact with the synthetic quartz glass body.

Compared to conventional processes, this process is exceedingly useful, for example, in the following points: (1) a considerably low treatment temperature can be used; (2) a synthetic quartz glass body which has undergone vitrification can be doped with fluorine; (3) a surface of a synthetic quartz glass body can be selectively doped with fluorine; and (4) although many materials (in particular, materials having a high aspect ratio, i.e., having a deep recess) cannot be treated by conventional general techniques for antireflection film deposition because the techniques employ vapor deposition or CVD (chemical vapor deposition), this process can treat surfaces of any shape so long as gas contact is possible. By partly and suitably masking the glass body, part of the surfaces or part of a surface may only be doped with fluorine. Furthermore, since the synthetic quartz glass body thus treated has a gradient fluorine concentration decreasing from the surface toward the depth direction, it can be inhibited from cracking due to thermal expansion between the surface part according to the invention and the inner parts when used, for example, at a high temperature.

The fluorinating agent usable in this case was already explained. When a fluorinating agent selected from the group consisting of elemental fluorine, silicon tetrafluoride, and mixtures of these is used, then the elemental fluorine used itself or the elemental fluorine or HF generated by the decomposition/reaction of the fluorinating agent can be utilized.

It is thought that in the fluorination, fluorine reacts with oxidation-unstable sites in the silicon in the synthetic quartz glass body to yield a substance essentially represented by the structural formula $SiO_xF_y$ ($1.92 \leq x < 2.0$; $0.00003 \leq y \leq 0.15$).

The formation of pores is thought to be attributable to the cleavage of Si—O—Si bonds and the formation of Si—F and other bonds. However, the mechanism of such change is unclear.

The kind of the diluting gas is not particularly limited so long as the diluting gas does not exert such an adverse influence that impairs the gist of the invention. A gas inert to the fluorinating agent, such as, e.g., nitrogen or argon, is generally preferred. By employing such a diluting gas, the rate of doping with the fluorinating agent can be regulated at will. In the gas containing the fluorinating agent diluted with the diluting gas, the partial pressure of the fluorinating agent is preferably in the range of from 1 kPa to 500 kPa. When the partial pressure thereof is lower than 1 kPa, there are often cases where the practical rate of doping is too low. In case where the partial pressure thereof exceeds 500 kPa, reaction control is difficult and there is a possibility, for example, that the synthetic quartz glass body might come to have noticeable surface roughness.

The total pressure of the system according to the invention is not particularly limited. As the total pressure increases, the apparatus cost becomes higher because of the necessity of a pressure-resistant treatment apparatus. On the other hand, in case where the total pressure is lower than atmospheric pressure, there is a possibility that the surrounding air might come into the reaction apparatus to inhibit the reaction. From the standpoints of apparatus cost and safety, a total pressure of 0-1 MPa (gauge pressure) is preferred.

Incidentally, the system may be kept in a reduced-pressure state with or without using a diluent. In this case, the preferred range of the partial pressure of the fluorinating agent is the same as that shown above. In the case where only the fluorinating agent according to the invention is present as the gas, the term "partial pressure" in the invention means "total pressure".

Besides the fluorinating agent and the diluting gas, other substances may exist in the gas to be used. This gas is acceptable. There are even cases where use of a substance which accelerates decomposition of the fluorinating agent is preferred. From the standpoint of accelerating the decomposition of the fluorinating agent or accelerating fluorination, a light such as, e.g., ultraviolet light may be used.

Of fluorinating agents, hydrogen fluoride in many cases is acceptable when used in a small amount. However, hydrogen fluoride is apt to roughen the surface to thereby reduce light transmittance. There are hence cases where to eliminate hydrogen fluoride or reduce the concentration thereof is preferred.

From such standpoint, it is preferred to make the contact in the presence of a solid metal fluoride. A solid metal fluoride can efficiently adsorb hydrogen fluoride to exclude the adverse influence thereof. This solid metal fluoride is not particularly limited. However, it is preferred to use one selected from the group consisting of the fluorides of alkali metals, the fluorides of alkaline earth metals, and mixtures of these. Sodium fluoride is especially preferred of these. The solid metal fluoride is solid, and may have any shape selected at will.

The temperature of the system in the contact, i.e., the temperature of the gas to be used, is not particularly limited. However, the temperature thereof is generally preferably in the range of from −50 to 300° C. when ease of reaction control is taken into account. When the temperature thereof is lower than −50° C., there are often cases where the reaction is slow and impracticable. In case where the temperature thereof exceeds 300° C., the reaction is too rapid and fluorine causes enhanced surface roughness. The reaction temperature is more preferably −20 to 200° C., even more preferably 60-160° C.

The temperature of the synthetic quartz glass body to be subjected to the reaction may be the same as or different from the gas temperature. However, a different temperature may be employed for the purpose of regulating the fluorine concentration distribution in the surface part according to the invention. For example, use may be made of a method in which the synthetic quartz glass body is placed on a heat-transferring substrate and the reaction is conducted while cooling the substrate. In this case, the rate of fluorine diffusion in the synthetic quartz glass body can be reduced. There is a possibility that compared to the case where such cooling is not conducted, that method might be capable of easily regulating the fluorine concentration gradient in the surface part according to the invention.

In this process, an end point for the contacting treatment can be suitably determined. It is, however, preferred to conduct the contacting treatment until at least one of the requirements (1) to (6) comes to be satisfied. Thus, a synthetic quartz glass body suitable for use in a given application can be easily obtained. The shapes of the synthetic quartz glass bodies according to the first to the third embodiments mentioned above and of the synthetic quartz glass body produced by such process can be selected at will according to applications. The "surface part" may be formed in all surfaces possessed by the synthetic quartz glass body or only in one or more of the surfaces thereof, or may be formed in part of all of or one or more of the surfaces thereof. The area where the "surface part" is not to be formed can be secured by masking with an appropriate substance. The surface of the "surface part" may be polished after the formation thereof. Polishing is useful in the case where the surface has been roughened due to the formation of pores, etching, etc.

The synthetic quartz glass body according to the invention preferably is a product which may have even or uneven thickness and may have a lens shape, the surface part being included in at least one side of the product. This synthetic quartz glass body more preferably is: the product having even thickness; the product having a flat surface; or the product having the surface part on each of both sides thereof. The synthetic quartz glass body may simultaneously have two or more of such more preferred properties. By imparting one or more of these properties, a synthetic quartz glass body preferred for practical use is obtained, such as, e.g., a lens-form or platy one.

Examples of the shape of the synthetic quartz glass body according to the invention include plate shapes, curved surface shapes such as lenses, polyhedrons such as prisms, and rod shapes such as optical fibers. In the case of a sheet shape or a plate shape, it has two surfaces (or six surfaces when narrow surfaces are included). In the case of a polyhedron such as a prism, it has four or more surfaces. In the case of a rod shape such as an optical fiber, it has one surface (or three surfaces when both ends are included).

Other Embodiments of the Invention

Those synthetic quartz glass bodies can be used as constituent elements for optical elements. There are cases where two or more synthetic quartz glass bodies according to the invention are used in an element. In this case, the synthetic quartz glass bodies may be arranged in intimate contact with each other so that the surface part according to the invention does not constitute a surface but is present substantially in an inner part. Such cases also are within the scope of the invention because the individual synthetic quartz glass bodies have the surface part according to the invention.

The optical element according to the invention should not be construed as being limited to one through which a light passes only once. As stated above, the synthetic quartz glass body according to the invention is effective also in the case where a light which has once passed through the synthetic quartz glass body is reflected by something and then passes through the synthetic quartz glass body again, as stated above. Because of this, the optical element can be effectively used also in such environments.

The optical element according to the invention preferably is one in which the synthetic quartz glass body is to be used for transmitting a light selected from the group consisting of infrared light, visible light, and ultraviolet light. In the ultraviolet region, absorption characteristic of material is apt to occur and usable materials are limited. However, the synthetic quartz glass body is one of the limited materials which transmit light in the ultraviolet region. From this standpoint, ultraviolet light is more preferred. An optical element in which a light passes through the synthetic quartz glass body two or more times and an optical element for exposure treatment in semiconductor device production also are useful in such applications.

Examples of such optical elements include lenses, prisms, optical fibers, optical windows, optical filters, diffraction gratings, wire grid polarizing filters, and wavelength plates.

Those optical elements can be employed in various optical apparatus. Examples of such apparatus include an apparatus including a light source, such as, e.g., an excimer laser or excimer lamp, which employs any of those optical elements, an apparatus employing any of those optical elements as a fiber for optical transmission, and an exposure tool for semiconductor device production.

EXAMPLES

Examples according to the Invention and Comparative Example are described below. Examples 1 to 6 are Examples according to the invention, and Example 7 is a Comparative Example.

Experiment

Figure 3:
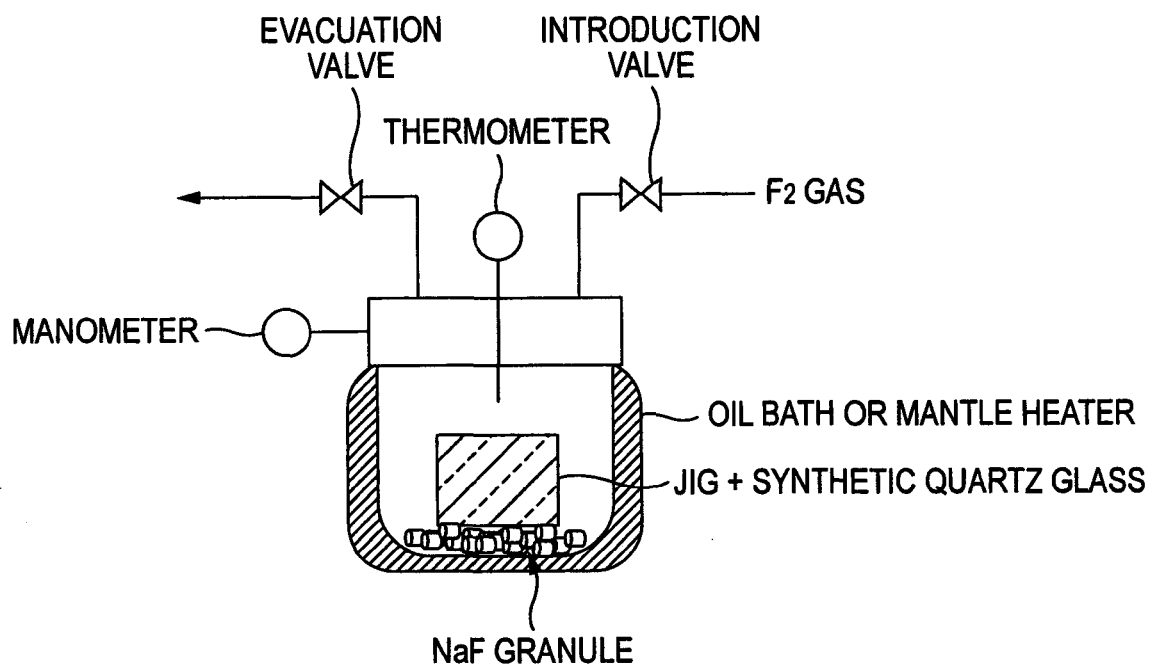
FIG. 3 is a diagrammatic view of a fluorination apparatus according to the invention.

An autoclave made of nickel was used for fluorination. Those parts of this autoclave which came into contact with gases were made of nickel, SUS316, Hastelloy, PTFE (polytetrafluoroethylene), and PFA (tetrafluoroethylene/perfluoroalkyl vinyl ether copolymer). A diagrammatic view of this fluorination apparatus is shown in FIG. 3.

It was found that when the high oxidative properties and reactivity of elemental fluorine are utilized to treat a synthetic quartz glass body with an elemental-fluorine atmosphere, then fluorine can be introduced at an exceedingly low temperature.

The synthetic quartz glass plate shown in Table 1 which had been formed into a flat plate (length, 2 cm; width, 2 cm; thickness 2.5 mm) shape was attached to a holder made of SUS316 and placed in the nickel autoclave (capacity, 1 L) together with the holder.

Subsequently, NaF granules (manufactured by Stella Chemifa Corp.) were inserted into the autoclave so as not to come into contact with the synthetic quartz glass plate. Thereafter, the contents were heated from outside the autoclave with an oil bath to elevate the internal temperature from ordinary temperature to 80° C. at a heating rate in the range of 0.5-2° C./min.

While the temperature in the apparatus was kept at 80° C., the apparatus was subsequently evacuated until the internal pressure reached 266 Pa or lower in terms of absolute pressure, and then held for 1 hour. This operation was intended to remove organic impurities, water, etc. which had contaminated the system. However, in case where such inclusions remain unremoved, there is a possibility that introduction of elemental fluorine might result in reaction with the inclusions to generate HF. Since the NaF has the ability to adsorb HF, it was used for the purpose of removing the HF thus generated.

Subsequently, elemental fluorine diluted with nitrogen gas to the concentration {$F_2$ concentration (vol %)} shown in Table 1 was used. The gas mixture was introduced at a rate of 120 NmL/min until the pressure in the apparatus reached 0.18 MPa in terms of gauge pressure. The contents were heated or cooled to the temperature (T° C.) shown in Table 1 at a rate in the range of from −2 to 2° C./min and then held for the time period t [hour] shown in Table 1. Thus, synthetic quartz glass plates having fluorinated surfaces (i.e., synthetic quartz glass materials according to the invention) were obtained.

Evaluation

<Fluorine Concentrations of Synthetic Quartz Glass Plates>

The depth-direction fluorine concentration distribution in each synthetic quartz glass plate was determined by SIMS analysis (ADEPT 1010, manufactured by ULVAC-PHI INC.) under the conditions of a primary ion of $Cs^+$, accelerating voltage of 5 kV, beam current of 100 nA, raster size of 300× 300 $\mu m^2$, and sample angle of 60°.

Depth from the surface was determined by measuring, with a stylus type film thickness meter, the depth of a sputtering crater formed by the SIMS analysis. Conditions for the SIMS analysis were determined so as to result in an etching rate of about 1.0 nm/sec, and the analysis interval was set at 3 seconds. Namely, the fluorine atom concentration in an outermost surface (depth from the surface is 0 nm) corresponds to an average fluorine atom concentration for a layer ranging from a depth from the surface of 0 nm to a depth from the surface of about 3 nm. Fluorine concentration was determined from a calibration curve concerning the relative secondary-ion intensity and concentration of fluorine and obtained by subjecting standard quartz glass samples having known fluorine concentrations to SIMS analysis under those conditions. The term "relative secondary-ion intensity of fluorine" means the intensity ratio between the value obtained by subtracting background signal intensity ($^{19}F^-_{BG}$) from fluorine secondary-ion intensity ($^{19}F^-$) and secondary-ion intensity for silicon as the host element ($^{28}Si^-$)[($^{19}F^-$ − $^{19}F^-_{BG}$)/$^{28}Si^-$]. The background signal intensity ($^{19}F^-_{BG}$) was determined by subjecting a fluorine-free quartz glass to SIMS analysis.

With respect to a gradient decrease, depth from the surface and the logarithm of fluorine concentration at a given depth from the surface are plotted along the X axis and the Y axis, respectively, and a linear relational expression concerning Y value and X value in the range of from 0 nm to about 15 nm in terms of depth from the surface was calculated by the least square method. Subsequently, that depth from the surface which corresponds to a fluorine concentration of 100 ppm by weight ($X_{100}$) was calculated using the linear relational expression calculated.

<Light Transmittance>

The transmittance of each synthetic quartz glass plate was measured in a wavelength range of from 180 nm to 230 nm with a vacuum ultraviolet spectrometer (VU-201, manufactured by Bunkoh-Keiki Co., Ltd.).

<Evaluation of Pores 1>

Each synthetic quartz glass plate was washed with hexane, subsequently washed with acetone, and further washed with ethanol. Thereafter, the glass plate was held in UV/ozone for 20 minutes to completely remove contaminants adherent to the surfaces and pores. A surface part of the synthetic quartz glass plate thus cleaned was examined with an X-ray photoelectron spectroscope (XPS; Quantera SXM; manufactured by ULVAC-PHI, INC.). With respect to conditions for the XPS analysis, a monochromatic $AlK_\alpha$ line was used as an X-ray source at 25 W, and the analysis was conducted under the conditions of a photoelectron detection area of 100 μm in diameter, photoelectron detection angle of 45 degrees, and pulse energy of 224 eV. Ar ions were used as sputtering ions. Through the XPS analysis, $S_{2p}$, $O_{1s}$, $C_{1s}$, and $F_{1s}$ peaks were examined in the depth direction. From the peak intensities for these, a depth-direction fluorine atom concentration profile ($C_{F0}$) in the synthetic quartz glass plate before the following silane coupling agent treatment was determined. Depth from the surface was determined from the $SiO_2$ thin film sputtering rate calculated from a depth-direction composition profile obtained by subjecting an $SiO_2$ thin film having a known thickness formed on a silicon substrate by sputtering to X-ray photoelectron spectroscopy under the same conditions.

Subsequently, the synthetic quartz glass plate cleaned was immersed in 1H,1H,2H,2H-perfluorodecyltrichlorosilane (hereinafter abbreviated to silane coupling agent) diluted with hexane 200 times. Thus, the silane coupling agent was introduced into pores. This synthetic quartz glass plate containing the silane coupling agent was examined for $S_{2p}$, $O_{1s}$, $C_{1s}$, and $F_{1s}$ peaks in the depth direction in the same manner as in the XPS analysis described above. Thus, the fluorine atom concentration profile of each synthetic quartz glass plate treated with the silane coupling agent ($C_{F1}$) was determined. Depth from the surface was determined from the sputtering rate for an $SiO_2$ thin film having a known thickness, in the same manner as described above.

Figure 4A:
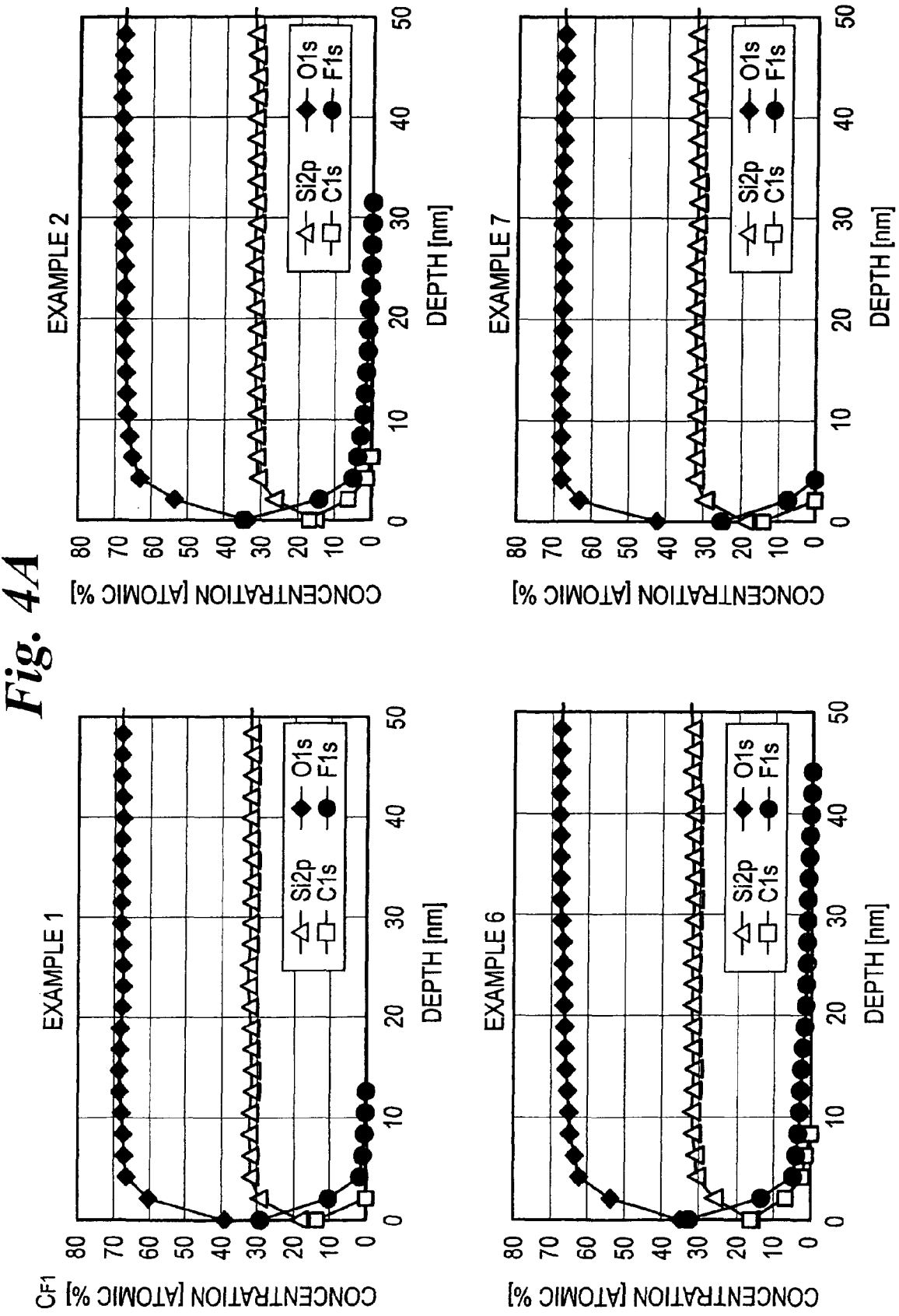
FIG. 4-A is graphs each showing the relationship between fluorine atom concentration after silane coupling agent treatment $C_{F1}$ and depth from the surface of the synthetic quartz glass plate.
Figure 4B:
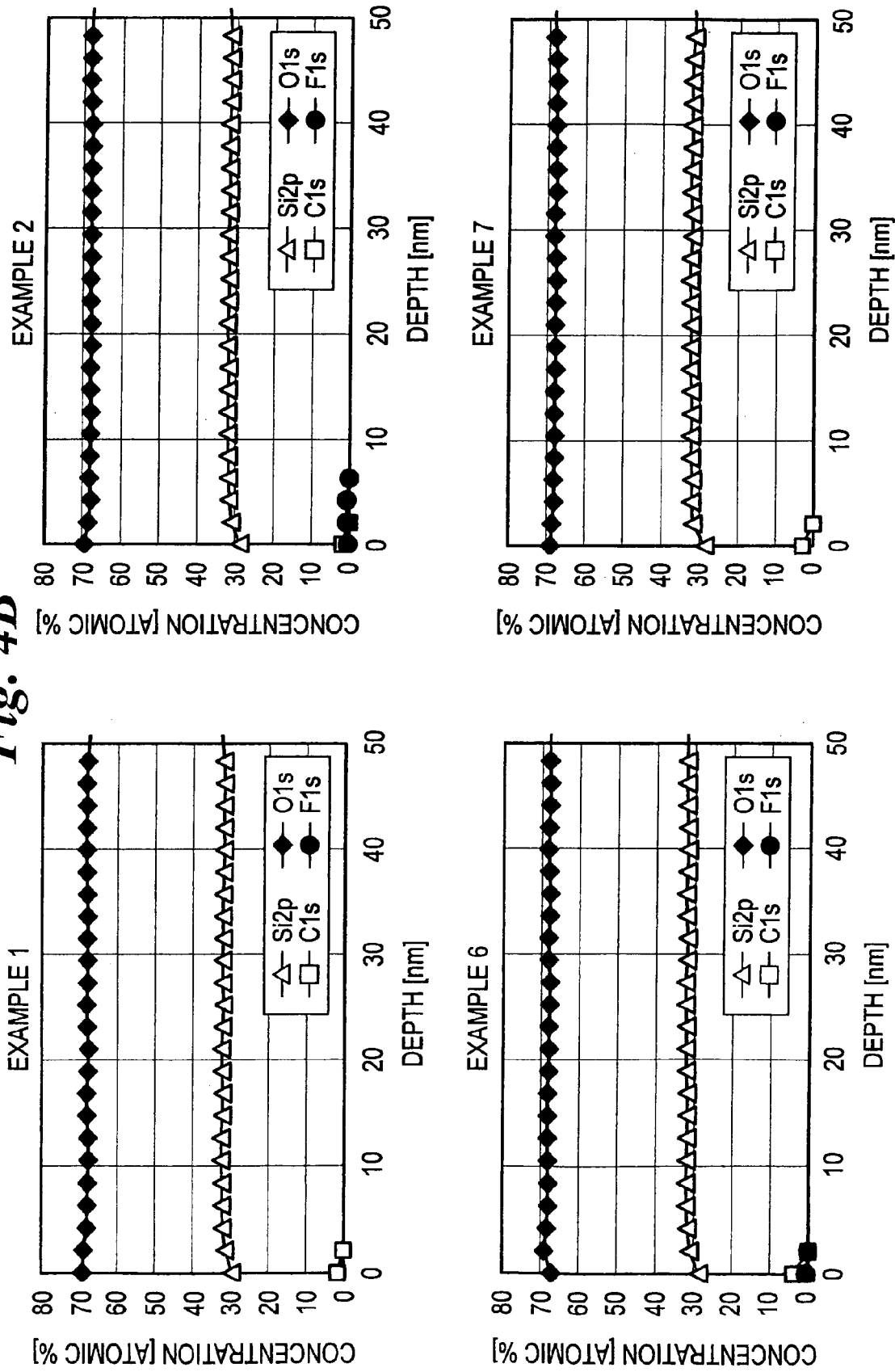

In FIG. 4-A are shown the concentration profiles after the silane coupling agent treatment in Example 1, Example 2, Example 6, and Example 7, respectively. In FIG. 4-B are shown the concentration profiles before the silane coupling agent treatment in Example 1, Example 2, Example 6, and Example 7, respectively. In each Example, the difference between the fluorine atom concentration after the silane coupling agent treatment $C_{F1}$ and the fluorine atom concentration before the silane coupling agent treatment $C_{F0}$ indicates the fluorine amount increased by the silane coupling agent treatment. It can be demonstrated that a region where $C_{F1}>C_{F0}$ has pores into which the silane coupling agent can intrude. Incidentally, the molecule of this silane coupling agent has a diameter of about 3 nm. When a smooth surface having no pores is treated with the silane coupling agent and a surface layer thereof ranging in depth from 0 to 3 nm is examined by XPS, then the silane coupling agent deposited on the outermost surface is detected. It is hence demonstrated that when a region where the measured value of $C_{F1}$ is sufficiently larger than that of $C_{F0}$ is observed at depths not smaller than 4 nm, then pores into which the silane coupling agent can intrude are present in the inner part of the synthetic quartz glass body.

<Evaluation of Pores 2>

The outermost surface of each synthetic quartz glass plate was examined with an atomic force microscope (SPA400-SPI4000, manufactured by Seiko Instruments Inc.) in the DFM mode. The examination region was set at 500 nm×500 nm, and the dynamic range for recess/protrusion contrast was set so as to range from the most protrudent points to a depth of 2 nm therefrom. Subsequently, the ratio (area ratio) between the area of recesses exceeding the dynamic range and the area of the examination region was calculated from the resultant image by image analysis. This area ratio is thought to indicate the porosity of the outermost surface.

Experimental Results

Figure 5:
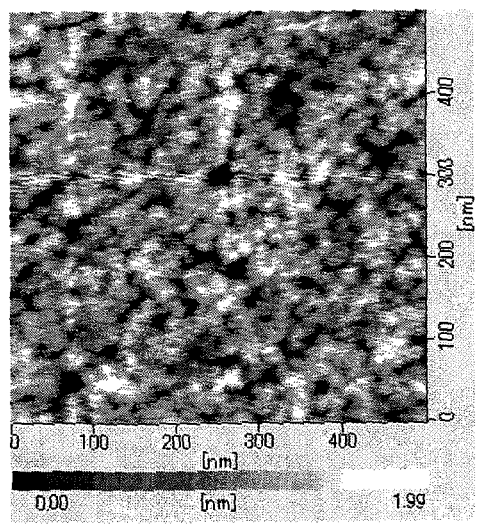
FIG. 5 is an AFM image in Example 6 and a view showing analysis results in which parts where recesses exceed a dynamic range are indicated in black and parts where recesses do not exceed the dynamic range are indicated in white.
Figure 5:
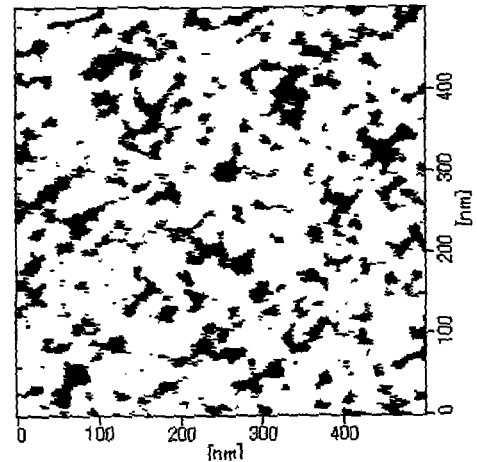
Figure 6:
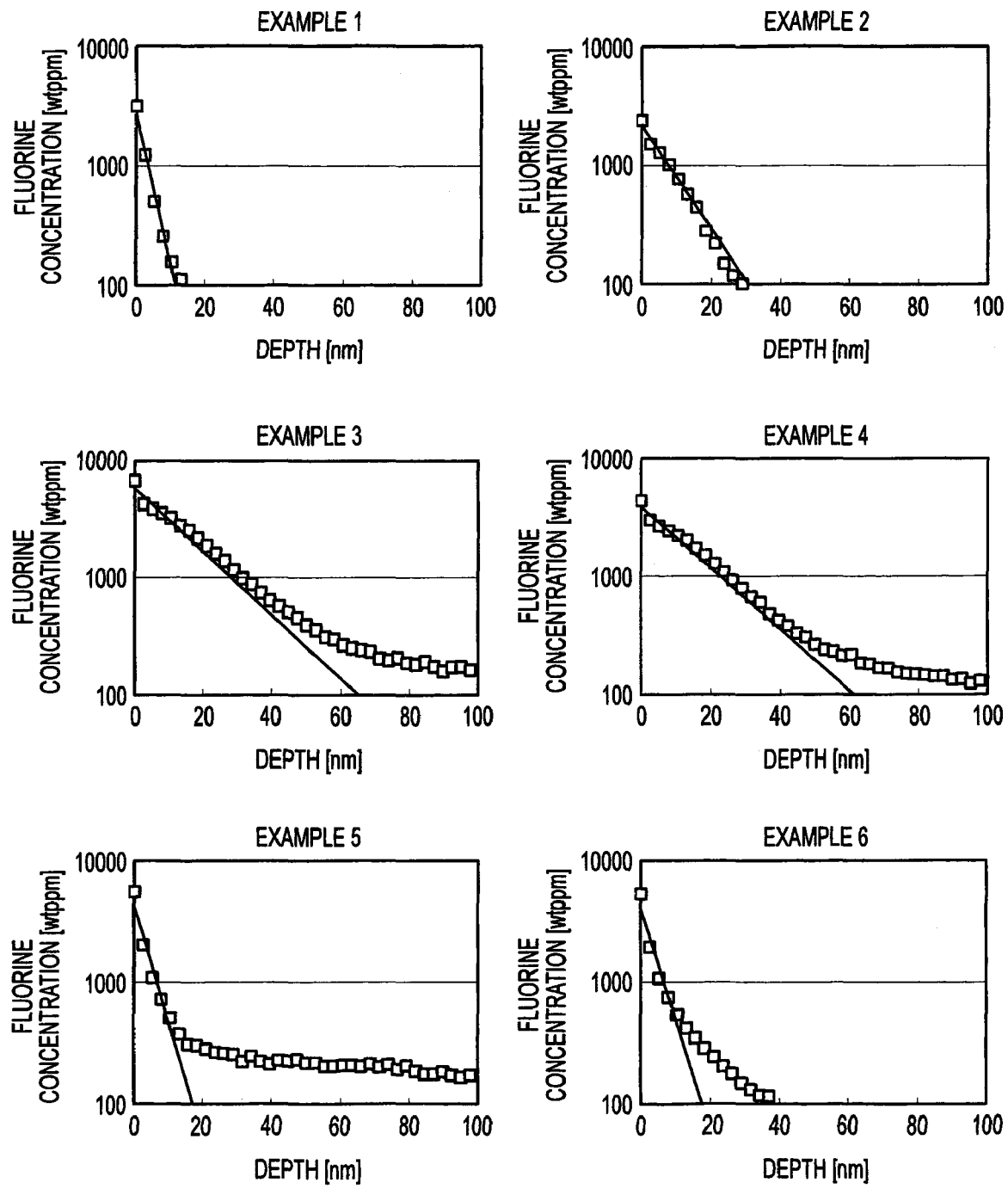
FIG. 6 is graphs each showing the relationship between measured fluorine concentration and depth from the surface of the synthetic quartz glass plate.

As shown in Table 1, it was ascertained that the fluorination treatment introduced fluorine in an amount of 0.2-0.7% in terms of outermost-layer fluorine concentration determined by SIMS analysis and that this treatment improved the transmittance of light having a wavelength of 193 nm by 0.4-3.6% as compared with that before the treatment. FIG. 5(*a*) shows an AFM image obtained in Example 6; and FIG. 5(*b*) shows analysis results in which the parts where recesses exceed the dynamic range are indicated in black and the parts where recesses do not exceed the dynamic range are indicated in white. FIG. 6 shows the relationship between measured fluorine concentration and depth from the surface of the synthetic quartz glass plate. The straight lines in FIG. 6 indicate the linear relational expression concerning Y value and X value calculated by the least square method in the range of from 0 nm to about 15 nm in terms of depth from the surface in the samples of Example 1 to Example 6.

TABLE 1

| | Kind of synthetic quartz glass | $F_2$ concentration $C_{F2}$ [vol %] | Temperature T [° C.] | Reaction time t [hour] | Fluorine concentration in outermost surface [wt %] | Transmittance [%] @193 nm | Depth of region where $C_{F1}>C_{F0}$ [nm] | AFM area ratio [—] | $X_{100}$ [nm] |
|---|---|---|---|---|---|---|---|---|---|
| Example 1 | AQQ grade manufactured by Asahi Glass | 1% | 80 | 1 | 0.3 | 91.0% | 13 | not measured | 12 |
| Example 2 | AQQ grade manufactured by Asahi Glass | 1% | 110 | 1 | 0.2 | 92.5% | 32 | not measured | 31 |
| Example 3 | AQQ grade manufactured by Asahi Glass | 1% | 130 | 1 | 0.7 | 94.2% | not measured | not measured | 65 |
| Example 4 | AQQ grade manufactured by Asahi Glass | 1% | 150 | 1 | 0.4 | 93.6% | not measured | not measured | 61 |
| Example 5 | AQQ grade manufactured by Asahi Glass | 20% | 80 | 1 | 0.6 | 92.6% | not measured | not measured | 17 |
| Example 6 | Example 2 sample | 20% | 80 | 1 | 0.5 | 94.7% | 44 | 20% | 18 |
| Example 7 | AQQ grade manufactured by Asahi Glass | untreated | untreated | untreated | 0 | 90.6% | 2 | 0% | — |

While the present invention has been described in detail and with reference to specific embodiments thereof, it will be apparent to one skilled in the art that various changes and modifications can be made therein without departing from the spirit and scope thereof.

This application is based on Japanese Patent Application No. 2007-162921 filed Jun. 20, 2007, and the contents thereof are herein incorporated by reference.

The invention claimed is:

1. A process for producing a synthetic quartz glass body having a modified surface part which comprises:
    bringing a fluorinating agent into contact with a surface of a synthetic quartz glass body in the presence of a solid metal fluoride; and
    infiltrating the fluorinating agent to inside the synthetic quartz glass body to modify the surface part.

2. The process for producing a synthetic quartz glass body of claim 1, wherein the solid metal fluoride comprises one member selected from the group consisting of fluorides of alkali metals, fluorides of alkaline earth metals, and mixtures thereof.

3. The process of claim 1, wherein the fluorinating agent has a partial pressure in the range of from 1 kPa to 500 kPa.

4. The process of claim 1, wherein the contacting treatment with the fluorinating agent is conducted until the synthetic quartz glass body being treated comes to satisfy at least one of the following requirements (1) to (6):
    (1) the synthetic quartz glass body has a light transmittance of 91.0% or higher when examined with ArF laser light (wavelength: 193 nm) incoming on the surface part at an incidence angle of 0°;
    (2) the synthetic quartz glass body has a light transmittance of 92.4% or higher when examined with KrF laser light (wavelength: 248 nm) incoming on the surface part at an incidence angle of 0°;
    (3) the synthetic quartz glass body has a light transmittance of 92.5% or higher when examined with the fourth harmonic of YAG light (wavelength: 266 nm) incoming on the surface part at an incidence angle of 0°;
    (4) the synthetic quartz glass body has a light transmittance of 93.0% or higher when examined with the third harmonic of YAG light (wavelength: 355 nm) incoming on the surface part at an incidence angle of 0°;
    (5) the synthetic quartz glass body has a light transmittance of 89.5% or higher when examined with xenon excimer lamp light (wavelength: 172 nm) incoming on the surface part at an incidence angle of 0°; and
    (6) the synthetic quartz glass body has a light transmittance of 93.0% or higher when examined with XeCl laser light (wavelength: 308 nm) incoming on the surface part at an incidence angle of 0°.

5. A process for producing a synthetic quartz glass body having a modified surface part which comprises:
    bringing a fluorinating agent into contact with a surface of a synthetic quartz glass body with a gas of the fluorinating agent or a gas mixture obtained by diluting the fluorinating agent with an inert gas; wherein the gas of the fluorinating agent or the gas mixture has a temperature in the range of from −50 to 300° C.; and
    infiltrating the fluorinating agent to inside the synthetic quartz glass body to modify the surface part.

6. The process of claim 5, wherein the fluorinating agent comprises one member selected from the group consisting of elemental fluorine, silicon tetrafluoride, and mixtures thereof.

7. The process of claim 5, wherein the fluorinating agent has a partial pressure in the range of from 1 kPa to 500 kPa.

8. The process of claim 5, wherein the contacting treatment with the fluorinating agent is conducted until the synthetic quartz glass body being treated comes to satisfy at least one of the following requirements (1) to (6):
    (1) the synthetic quartz glass body has a light transmittance of 91.0% or higher when examined with ArF laser light (wavelength: 193 nm) incoming on the surface part at an incidence angle of 0°;
    (2) the synthetic quartz glass body has a light transmittance of 92.4% or higher when examined with KrF laser light (wavelength: 248 nm) incoming on the surface part at an incidence angle of 0°;
    (3) the synthetic quartz glass body has a light transmittance of 92.5% or higher when examined with the fourth harmonic of YAG light (wavelength: 266 nm) incoming on the surface part at an incidence angle of 0°;
    (4) the synthetic quartz glass body has a light transmittance of 93.0% or higher when examined with the third harmonic of YAG light (wavelength: 355 nm) incoming on the surface part at an incidence angle of 0°;
    (5) the synthetic quartz glass body has a light transmittance of 89.5% or higher when examined with xenon excimer lamp light (wavelength: 172 nm) incoming on the surface part at an incidence angle of 0°; and
    (6) the synthetic quartz glass body has a light transmittance of 93.0% or higher when examined with XeCl laser light (wavelength: 308 nm) incoming on the surface part at an incidence angle of 0°.

* * * * *